United States Patent
Visser

(10) Patent No.: US 10,599,282 B2
(45) Date of Patent: Mar. 24, 2020

(54) CURSOR CONTROL FOR A VISUAL USER INTERFACE

(71) Applicant: KONINKLIJKE PHILIPS N.V., Eindhoven (NL)

(72) Inventor: Michiel Cornelis Visser, Eindhoven (NL)

(73) Assignee: Koninklijke Philips N.V., Eindhoven (NL)

(*) Notice: Subject to any disclaimer, the term of this patent is extended or adjusted under 35 U.S.C. 154(b) by 299 days.

(21) Appl. No.: 14/373,743

(22) PCT Filed: Feb. 12, 2013

(86) PCT No.: PCT/IB2013/051139
§ 371 (c)(1),
(2) Date: Jul. 22, 2014

(87) PCT Pub. No.: WO2013/121350
PCT Pub. Date: Aug. 22, 2013

(65) Prior Publication Data
US 2015/0007116 A1    Jan. 1, 2015

Related U.S. Application Data

(60) Provisional application No. 61/598,458, filed on Feb. 14, 2012.

(51) Int. Cl.
*G06F 3/0481* (2013.01)
*G06F 3/0484* (2013.01)

(52) U.S. Cl.
CPC ...... *G06F 3/04812* (2013.01); *G06F 3/04842* (2013.01)

(58) Field of Classification Search
CPC .............................. G06F 3/0481; G06F 3/0484
(Continued)

(56) References Cited

U.S. PATENT DOCUMENTS 5,726,681 A      3/1998 Kanamori
5,969,708 A  * 10/1999 Walls .................. G06F 3/04842
                                                        345/157

(Continued)

FOREIGN PATENT DOCUMENTS

JP         0876956 A     3/1996
JP        10254676 A     9/1998
(Continued)

OTHER PUBLICATIONS

Ball et al, "Dynamic Size and Speed Cursor for Large, High-Resolution Displays", Center for Human-Computer Interaction; Department of Computer Science, Virginia Polytechnic Institute and State University, Undated, pp. 1-10.
(Continued)

*Primary Examiner* — Tadesse Hailu
*Assistant Examiner* — Darrin Hope

(57) ABSTRACT

A device (10) is provided having a visual user interface enabling a user to select one of one or more displayed objects (O1, O2, O3, O4) with a cursor (CR) having a cursor area. The device comprises a cursor control facility (12) for controlling display of the cursor and a calculating facility (14) for calculating for each object that is at least partly within the cursor area a coverage fraction ($\omega_{oi}$). The coverage fraction ($\omega_{oi}$) is indicative for the fraction of that object (Oi) covered by the cursor and for summing these coverage fractions to obtain a coverage indicator (CI). The cursor control facility is arranged for adapting a size of the cursor to a size that achieves a predetermined value for the coverage indicator. Furthermore a method and a storage medium are provided.

16 Claims, 7 Drawing Sheets

(58) Field of Classification Search
USPC ............................................. 715/856
See application file for complete search history.

(56) References Cited

U.S. PATENT DOCUMENTS

| | | | |
|---|---|---|---|
| 6,844,887 B2 | 1/2005 | Laffey et al. | |
| 7,043,701 B2 | 5/2006 | Gordon | |
| 2009/0172593 A1 | 7/2009 | Geurts et al. | |
| 2009/0217209 A1 | 8/2009 | Chen et al. | |
| 2009/0249257 A1* | 10/2009 | Bove .................. | G06F 3/04812 715/858 |
| 2010/0262933 A1 | 10/2010 | Kim et al. | |
| 2011/0202835 A1 | 8/2011 | Jakobsson et al. | |
| 2013/0125066 A1* | 5/2013 | Klein .................. | G06F 3/04812 715/862 |

FOREIGN PATENT DOCUMENTS

| | | |
|---|---|---|
| WO | 0038042 | 6/2000 |
| WO | 2013074333 A1 | 5/2013 |

OTHER PUBLICATIONS

Slavova, "Attentive Interfaces—Summary", Department of Computer Science, University of Saskatchewan, Undated; pp. 1-3.

Parker et al, "Tractorbeam Selection Aids: Improving Target Acquisition for Pointing Input on Tabletop Displays", Interact, 2005, pp. 80-93.

Hertzum et al, "Input Techniques That Dynamically Change Their Cursor Activation Area: A Comparison of Bubble and Cell Cursors", Science Direct, Int. J. Human-Computer Studies 65, 2007, pp. 833-851.

Grossman et al, "The Bubble Cursor: Enhancing Target Acquisition by Dynamic Resizing of The Cursor's Activation Area", XP-002443616; Smart Interaction Techniques 1, CHI 2005, pp. 281-290.

Laukkanen et al, "The Cone and The Lazy Bubble: Two Efficient Alternatives Between the Point Cursor and the Bubble Cursor", CHI 2008 Proceedings, Touch and Target Selection, pp. 309-312.

Kabbash, "The 'Prince' Technique: Fitts' Law and Selection Using Area Cursors", XP000538456, May 1995, pp. 273-279.

Ren et al, "The Adaptive Hybrid Cursor: A Pressure-Based Dtarget Selection Technique For Pen-Based User Interfaces", Interact, vol. 4662, Part I, 2007, pp. 310-323.

McGuffin et al "Fitts' Law and Expanding Targets: Experimental Studies and Designs for User Interfaces" ACM Transactions on Computer Human Interaction, vol. 12, No. 4, Dec. 2005 p. 388-422.

Aileen Worden et al "Making Computers Easier for Older Adults to Use: Area Cursors and Sticky Icons" Proceedings of the 1997 Conference on Human Factors in Computing Systems, CHI—Atlanta, GA, USA Duration: Mar. 22, 1997 Mar. 27, 1997.

* cited by examiner

CURSOR CONTROL FOR A VISUAL USER INTERFACE

CROSS-REFERENCE TO PRIOR APPLICATIONS

This application is the U.S. National Phase application under 35 U.S.C. § 371 of International Application No. PCT/IB2013/051139, filed on Feb. 12, 2013, which claims the benefit of U.S. Provisional Application No. 61/598,458, filed on Feb. 14, 2012. These applications are hereby incorporated by reference herein.

FIELD OF THE INVENTION

The present invention relates to a method for controlling a cursor in a visual user interface.

The present invention further relates to a device for controlling a cursor in a visual user interface.

The present invention still further relates to a storage medium having stored thereon a computer program enabling a processor to carry out the method.

BACKGROUND OF THE INVENTION

In many visual interfaces a user is capable to select an object from a plurality of target objects displayed on a display by pointing the object with a cursor. The activation area of a cursor is defined as the area wherein an object can be activated provided that no other objects are within said area. While a standard point cursor has a single point of activation or hotspot, area cursors have larger hotspots defined by the boundary of the cursor. Grossman et al. describe such an area cursor in "The Bubble Cursor: Enhancing Target Acquisition by Dynamic Resizing of the Cursor's Activation Area", CHI 2005|PAPERS: Smart Interaction Techniques 1. An area cursor, such as the bubble cursor described in the publication by Grossman et al. is advantageous in that for activating an object it is sufficient if the area inside (partially) overlaps the object. Problems arise, however, when the area cursor encompasses more than one object, making it difficult to isolate the intended target object (target). The bubble cursor solves this problem of the area cursor by dynamically updating its size based on the proximity of surrounding targets, such that there is always exactly one target inside the hotspot.

SUMMARY OF THE INVENTION

It is an object of the invention to provide an improved method for controlling a cursor in a user interface.

It is a further object of the invention to provide an improved device for controlling a cursor in a user interface.

It is a still further object to provide a storage medium having stored thereon a computer program enabling a processor to carry out the improved method.

According to a first aspect of the invention a device is provided having a visual user interface enabling a user to select one of one or more displayed objects by displaying a cursor having a cursor area, the device comprising a cursor control facility and a calculating facility. The cursor control facility is arranged for controlling display of the cursor and the calculating facility is arranged for calculating for each object that is at least partly within the cursor area a coverage fraction indicative for the fraction of that object covered by the cursor and for summing these coverage fractions to obtain a coverage indicator. The cursor control facility is arranged for adapting a size of the cursor to a size that achieves a predetermined value for the relative coverage indicator.

According to a second aspect of the present invention, a method for displaying a cursor having a cursor area on a display showing one or more objects, comprises the steps of
calculating for each object that is at least partly within the cursor area a coverage fraction indicative for the fraction of that object covered by the cursor,
calculating (S1) a coverage indicator indicative for the sum of the relative coverage fractions for each of the objects,
adapting (S3) a size of the cursor to a size that achieves a predetermined value for the coverage indicator.

According to a third aspect of the present invention a computer program product is provided comprising a computer program enabling a processor to carry out the method of the second aspect.

According to the present invention the cursor area may comprise more than one object. The object having the highest relative coverage is determined as the activatable object. Although the cursor area may comprise more than one object, it is clearly visible to the user which object has the highest relative coverage and therewith is the activatable object. In a practical embodiment the predetermined value is 1. Nevertheless, the predetermined value may also be smaller or larger dependent on preferences of the user, e.g. in the range of 0.5 to 2.

An embodiment of the device according to the first aspect further comprises a calculating facility for calculating a shape indicator indicative for an average shape of said objects that are at least partly within the cursor area. The shape indicator is obtained from shape parameters of the nearby objects weighted by the fraction of said nearby objects covered by the cursor. The shape of the cursor is adapted to a shape indicated by said shape indicator. This embodiment facilitates navigation and object selection in environments wherein objects have relatively anisotropic shapes. The shape indicator maybe provided in various ways to indicate an average shape of the relevant objects. For example the shape indicator may indicate a weighted average of the width and height of the covered objects, weighted according to the coverage fraction of the objects. Alternatively, the shape indicator may indicate a ratio between width and height computed as the weighted average obtained for the covered objects. The shape indicator may alternatively be an indication for an average orientation. This shape indicator can be used to align a cursor having a fixed ratio between its longest dimension and its shortest dimension in a direction best corresponding to that of the covered objects. The weight indicator may alternatively be indicative for a larger number of shape parameters. For example the cursor may be bounded by a closed curve specified by an arbitrary number of points. The closed curve is for example composed of splines or Bezier-curves and the n-points are control points of these splines or Bezier curves.

Likewise an embodiment of the method further comprises the step of calculating a shape indicator indicative for an average shape of nearby objects at or near the cursor position, said shape indicator being obtained from shape parameters of the nearby objects weighted by the relative coverage of said nearby objects, and adapting a shape of the cursor to a shape indicated by said shape indicator.

In an embodiment of this embodiment the shape indicator is indicative for a relation between a width and a height of said nearby objects. The information provided by the shape indicator may be used to adapt a width and a height of the cursor according to the following steps:

decreasing a width of the cursor if the value of the coverage indicator is greater than the predetermined value and if the width of the cursor is greater than a width derived from the height of the cursor and the relation between a width and a height indicated by the shape indicator;

decreasing a height of the cursor if the value of said coverage indicator is greater than the predetermined value and if the width of the cursor is less than a width derived from the height of the cursor and the relation between a width and a height indicated by the shape indicator;

increasing a height of the cursor if the value of said coverage indicator is less than the predetermined value and if the width of the cursor is greater than a width derived from the height of the cursor and the relation between a width and a height indicated by the shape indicator; or increasing a width of the cursor if the value of said coverage indicator is less than the predetermined value and if the width of the cursor is less than a width derived from the height of the cursor and the relation between a width and a height indicated by the second indicator.

In this way dimensions of the cursor can be rapidly determined in an iterative approach.

In an embodiment the device according to the first aspect of the invention comprises a storage medium for storing respective predetermined values for the size and shape of the cursor associated with positions in a subset of possible cursor positions. Furthermore, the cursor control facility is arranged for adapting a size a size and shape of the cursor according to respective predetermined values for the size and shape stored in the storage medium for a current cursor position. In this case, it is not necessary to repeat the calculation of the cursor shape and size if the cursor returns to an earlier visited position, provided that the content of the display has not changed. Advantageous variations of this embodiment are possible. For example, for an arbitrary position of the cursor, the cursor control facility may adapt a size and shape of the cursor according to data obtained by interpolation from predetermined values for the size and shape known for positions nearest to said arbitrary position. Furthermore the cursor control facility may iteratively calculate the size and shape of the cursor and use the stored data or the interpolated data as initial values for this iterative calculation.

During operation of the device, the cursor movement in display space may be a linear function of cursor control input in motor space, e.g. a displacement indicated by a user with a pointing device such as a mouse. An embodiment of the device according to the first aspect has a gain control unit. The gain control unit provides for a conversion of coordinates in motor space into coordinates in display space by a gain factor dependent on the size and shape of the cursor. In an embodiment the gain control unit receives a cursor input signal indicating an input value for a displacement speed of the cursor and provides an output signal resulting in a displacement of the cursor with a displacement speed related to the input signal by a gain factor that is a monotonously non-decreasing function of the momentary value of the size of the cursor. For example, the cursor speed in a direction may be amplified by a factor that is proportional to the size of the cursor in that direction. This facilitates navigation in display environments having objects of different sizes and shapes. In this way it is easy for the user to move the cursor slowly in display environments having relatively small objects, and to move relatively fast in display environments having relatively large objects. In an embodiment the dimensions of the cursor in display space (visual dimensions) differ from the dimensions of the cursor used to calculate the coverage fraction for the objects (the virtual dimensions). In that case, if the gain is dependent on the size of the cursor it is in some circumstances preferable to determine the gain in dependence on the virtual dimensions.

A further embodiment of the device according to the invention is provided with a signaling facility. The signaling facility receives information indicating which object has the highest coverage fraction and uses this information to signal this object as the identified object by an autonomous movement of the cursor to the identified object. By this movement it is signaled to the user that this object is currently considered as the object identified by the user. Alternatively, or additionally the signaling facility may signal the object considered as the identified object by causing the cursor control facility to adapt the size and shape of the cursor to that of the object. In an embodiment the signaling facility has a timer that activates the signaling facility if no user input has been received during a predetermined time-interval.

BRIEF DESCRIPTION OF THE DRAWINGS

These and other aspects are described in more detail with reference to the drawing. Therein.

DETAILED DESCRIPTION OF EMBODIMENTS

Like reference symbols in the various drawings indicate like elements unless otherwise indicated.

Figure 1A:
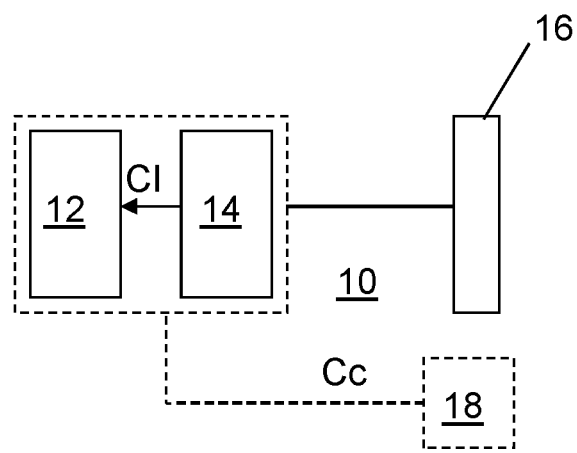
FIG. 1A shows a first embodiment of a device according to the first aspect of the invention.

FIG. 1A shows a device 10 having a visual user interface that enables a user to select one of one or more objects O1, O2, O3, O4 displayed on a display 16 (See FIG. 1B) with a cursor CR having a cursor area, here a circular area. The device comprises a cursor control facility 12 for controlling display of the cursor dependent on cursor control signals Cc.

In an embodiment the user may provide control signals for controlling the cursor position, for example by input device 18, such as arrow keys, a mouse, a trackball, a touchpad or a touchsensitive layer in the display. Alternatively the user may provide audible signals (e.g. right/left) or visual signals (gestures), which are converted by an audio input device, e.g. a speech recognition device, or by a video input device into control signals. In these embodiments the user actively moves the cursor until it sufficiently covers the target object. Subsequently the user can activate the target object. It is however not necessary that the user provides the cursor control signals. In another embodiment the cursor position is automatically moved relative to the objects on the display, by moving the objects, the cursor or both. In that case the user merely needs to activate the target object once it is sufficiently covered by the cursor.

The device further comprises a calculating facility 14 for calculating for each object O1, O2, O3 that is at least partly within the cursor area a coverage fraction indicative for the fraction of that object covered by the cursor and for summing these coverage fractions to obtain a coverage indicator. The cursor control facility 12 is arranged for adapting a size of the cursor CR to a size corresponding to a predetermined value for the coverage indicator CI.

The coverage fraction is the fraction $\omega_{oi}$ of the area $A_{oi}$ occupied by the object Oi on the display that is covered by the cursor CR.

Accordingly $$\omega_{oi} = \frac{A_{cr} \cap A_{Oi}}{A_{Oi}}$$

Therein $A_{cr}$ is the area of the cursor. Typically the area $A_{cr}$ corresponds to the area occupied by the cursor on the display. However, if desired the cursor may be displayed with a smaller or larger area, than the area that is used to calculate the coverage fraction.

Accordingly the coverage indicator is determined by:

$$CI = \sum_{i \in items} \omega_{oi}$$

Figure 2:
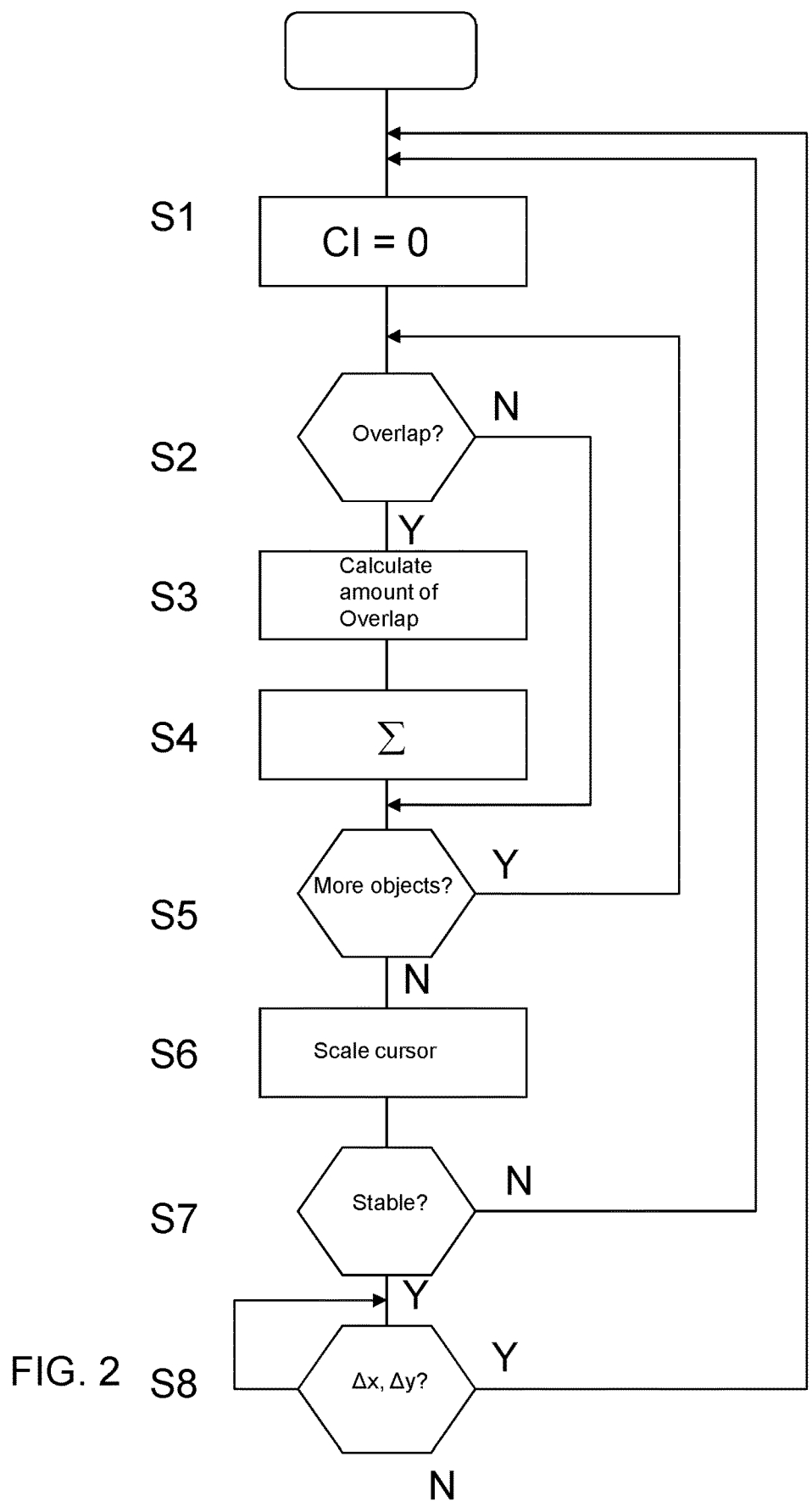
FIG. 2 illustrates a first embodiment of a method according to the second aspect of the invention.

FIG. 2 schematically shows a procedure for adapting a size of the cursor CR. In a first step S1 an initialization takes place. Therein a sum value is initialized at zero and an object counter is initialized. In a second step S2 it is determined whether the object Oi. indicated by the object counter is partially overlapped by cursor CR. If this is the case (Y), Step S3 of the procedure is executed, wherein the fraction $\omega_{oi}$ is calculated as indicated above. Subsequently, in step S4 this value is added to the sum value. In step S5 it is verified whether any objects remain that could be overlapped by the cursor. If this is the case, the procedure returns to step S2. If overlap was verified for each of the objects, procedure continues with step S6. Therein the size of the cursor is adapted depending on the value computed for the coverage indicator CI. In step S7 it is determined whether a termination criterion is complied with. If that is not the case, the procedure is repeated, starting with step S1. Otherwise the procedure proceeds with a waiting state, waiting for an event, for example a change in the relative position of the cursor CR or a new object O appearing on the display 16.

In case the cursor is specified by a single parameter, e.g. a radius, or an area, the cursor control facility 12 can adapt the size of the cursor CR to a size corresponding to a predetermined value, e.g. 1, for the coverage indicator CI for example by reducing that parameter in with a predetermined delta-value in step S6 if the coverage indicator CI is higher than the predetermined value and by increasing that parameter with a predetermined delta-value in step S6 if the coverage indicator CI is less than the predetermined value until the absolute value of the difference between the coverage indicator and the predetermined value is less than a threshold value. A termination criterion in step S7 is for example the event that the coverage indicator CI is higher than the predetermined value in the present iteration and lower than the predetermined value in the previous iteration or the other way around.

In alternative embodiment the control facility 12 adapts the parameter with a value that depends on the magnitude of the deviation from the predetermined value. A termination criterion in step S7 is for example the event that the absolute difference between the coverage indicator CI and the predetermined value is less than a predetermined threshold value.

Figure 1B:
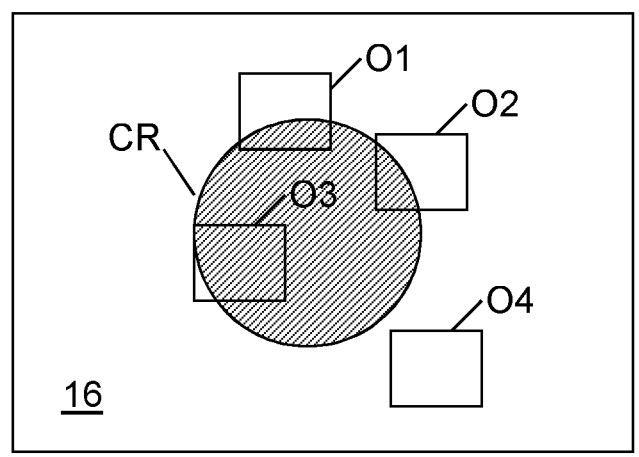
FIG. 1B shows a detail of the device of FIG. 1A in an operative mode.

By way of example, the cursor shown in FIG. 1B has a circular shape. However, various other shapes such as a rectangle, an ellipse, a star etc are possible. The cursor can be adapted for example by changing its size dependent on the coverage indicator while maintaining its shape. This is however not necessary, as is illustrated in the following embodiment.

Figure 3A:
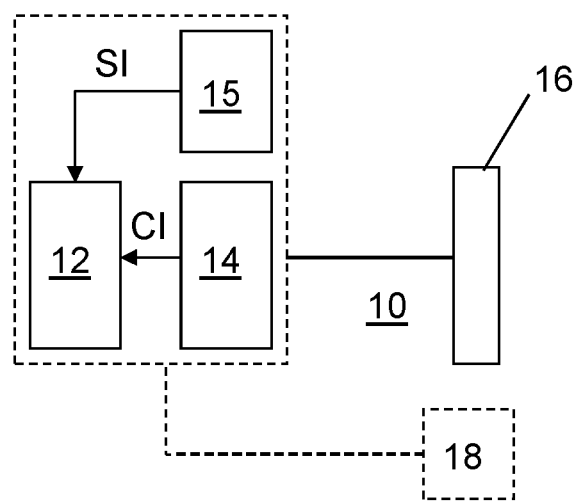
FIG. 3A shows a second embodiment of a device according to the first aspect of the invention.

FIG. 3A shows an improved embodiment of the device 10 that further comprises a calculating facility 15 for calculating a shape indicator SI indicative for an average shape of said objects that are at least partly within the cursor area. The shape indicator SI is obtained from shape parameters of the nearby objects weighted by the fraction of said nearby objects covered by the cursor. The shape of the cursor CR is adapted to a shape indicated by said shape indicator.

Figure 3B:
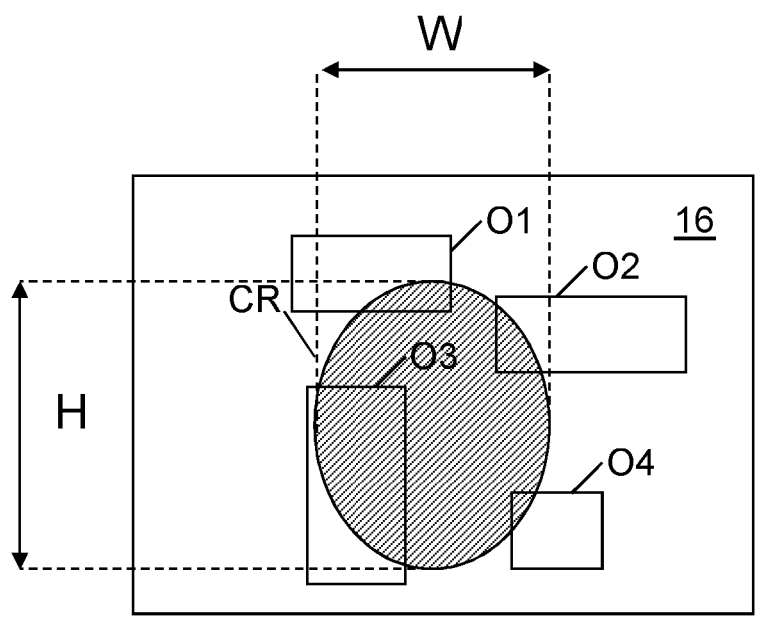
FIG. 3B shows a detail of the device of FIG. 3A in an operative mode.

In FIG. 3B, the cursor is shaped as an ellipse having a variable height H and a variable width W. In this case the shape indicator SI used for controlling the shape of the cursor may have a width component $SI_w$ and a height component $SI_h$ defined as follows.

$$SI_w = \sum_{i \in items} \omega_{oi} \cdot W_{oi}$$

$$SI_h = \sum_{i \in items} \omega_{oi} \cdot H_{oi}$$

To that end, step S4 in the method shown in FIG. 2 is modified to include the computation of these components $SI_w$ and $SI_h$.

The cursor can now be adapted on the base of the coverage indicator CI and the shape indicator SI using one of the following relations in addition to the restriction that the coverage indicator CI is set to a predetermined value.

$$(W-H)-(SI_w-SI_h)=0$$

Or alternatively $$\frac{W}{H} - \frac{SI_w}{SI_h} = 0$$

Figure 4A:
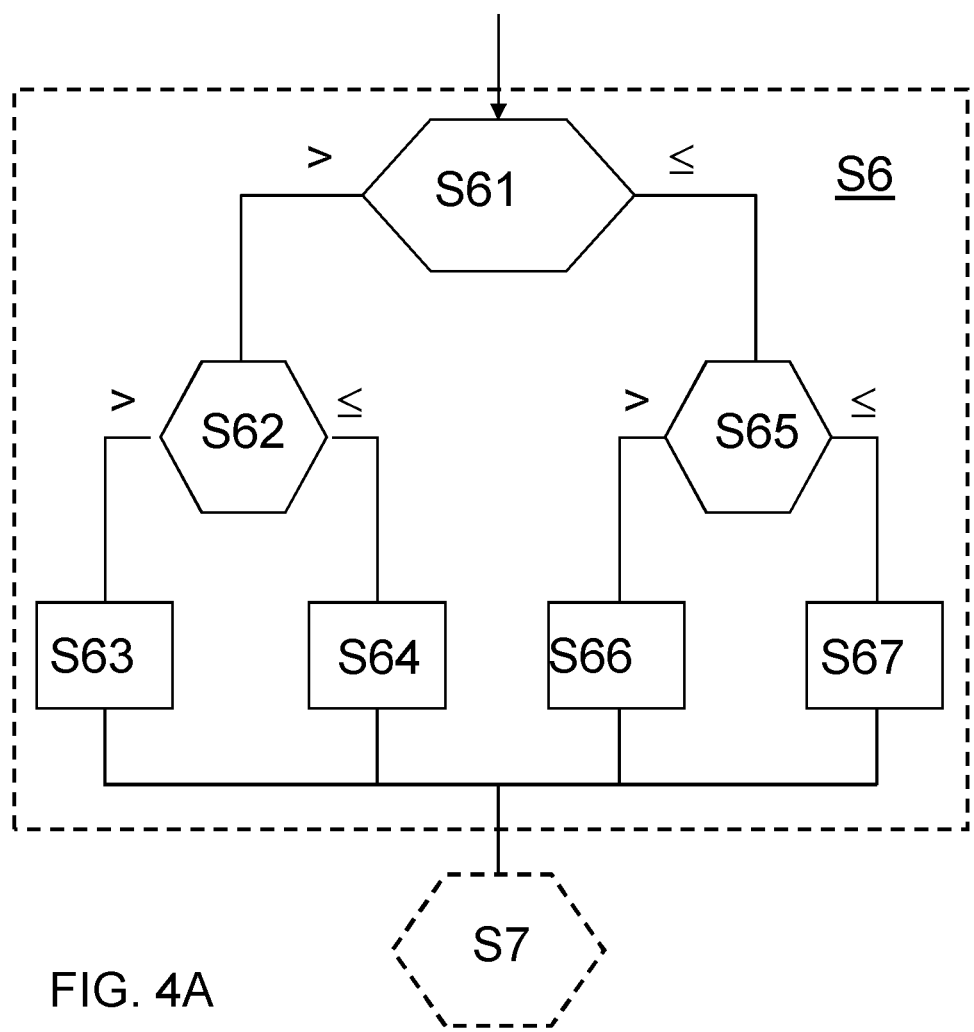
FIG. 4A illustrates a detail of a second embodiment of a method according to the second aspect of the invention.

This can be realized by an adaptation of step S6 in the procedure of FIG. 2 as shown in FIG. 4A.

Therein Step S6 comprises a first substep S61, wherein it is determined whether the coverage indicator CI is greater than the predetermined value for the coverage indicator.

If this is the case, the procedure follows with substep S62, wherein it is verified whether $$(W-H)-(SI_w-SI_h)>0$$

If it is determined that this difference is greater than 0, then substep S63 is carried out, wherein the width W is reduced by a value ΔW. Otherwise, substep S64 is carried out, wherein the height H is reduced by a value ΔH.

If it is determined in first substep S61 that the coverage indicator CI is not greater than the predetermined value for the coverage indicator, then the procedure continues with substep S65. As in substep S62 it is verified therein whether $$(W-H)-(SI_w-SI_h)>0$$

If it is determined that this difference is greater than 0, then substep S66 is carried out. Therein the height H is increased by a value ΔH. If the difference is not greater than 0, then the width W is increased by a value ΔW.

After each one of the steps S63, S64, S66 or S67 is executed, procedure continues with step S7.

Figure 4B:
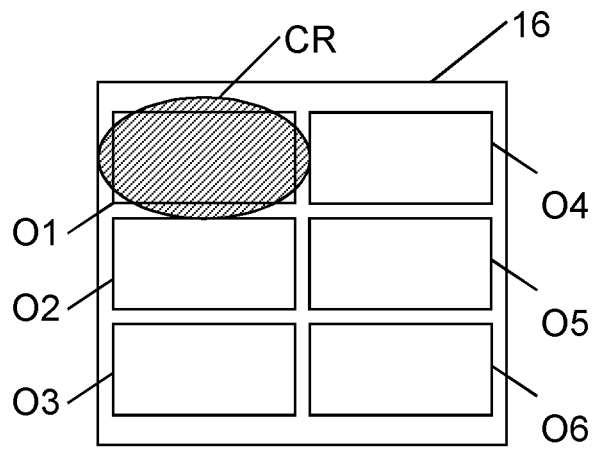
FIG. 4B, 4C illustrates operation according to the method of FIG. 4A.
Figure 4C:
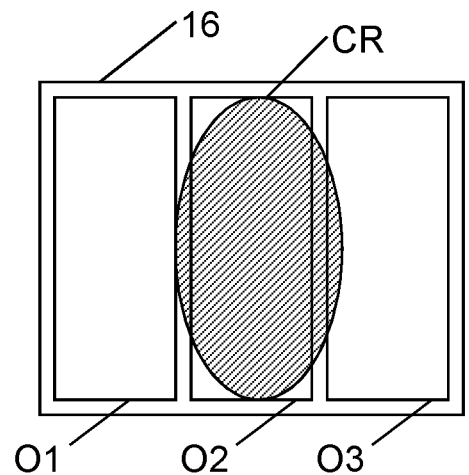

FIG. 4B, 4C show by way of example how the cursor adapts its size and shape dependent on the objects present on the display 16. In the environment of FIG. 4B the cursor adapts it shape to the relatively wide and low object O1, by assuming the shape of an ellipse elongated in horizontal direction. In the environment of FIG. 4C the cursor adapts it shape to the relatively high and narrow object O1, by assuming the shape of an ellipse elongated in vertical direction.

Although the measure of adapting the shape of the cursor to the shape of the overlapped objects is illustrated here by way of example for an ellipse shape cursor of which a width and a height is adapted, this measure is equally applicable to other types of area cursors, such as rectangular or star shaped cursors or cursors having any other shape. In each case the cursor can be stretched or compressed to adapt to the shape indicator SI. Also other adaptations of shape of the cursor are possible. For example, the cursor may be provided with an orientation that depends on the average orientation of objects that it overlaps. The average orientation can be determined in a similar way as was done for the average height and width, by weighting the orientation of objects by their coverage fraction $\omega_{oi}$. Also more complex shape adaptations are possible, for example the cursor may be displayed as a polygon having a number of sides dependent on the average number of sides of objects that it (partially) overlaps.

The height of the cursor or an object is the dimension of the object in a first direction of the display and the width the cursor or an object is the dimension of the object in a second direction of the display transverse to the first dimension. The height and width are for example determined as the dimensions in the first and second direction respectively of a bounding box associated with the object or the cursor. In an alternative embodiment the height and width are defined as an average value for the dimensions of the object or the cursor in said first direction and in said second direction respectively. In that case the height of an object or cursor may be the average value obtained for the first dimension in subsequent columns wherein the object or cursor is displayed, and the width of an object or cursor may be the average value obtained for the second dimension in subsequent rows wherein the object or cursor is displayed. The latter two embodiment are also suitable if the object or cursor is not a rectangle, or is rectangle that is not aligned with the first and second direction.

Figure 5:
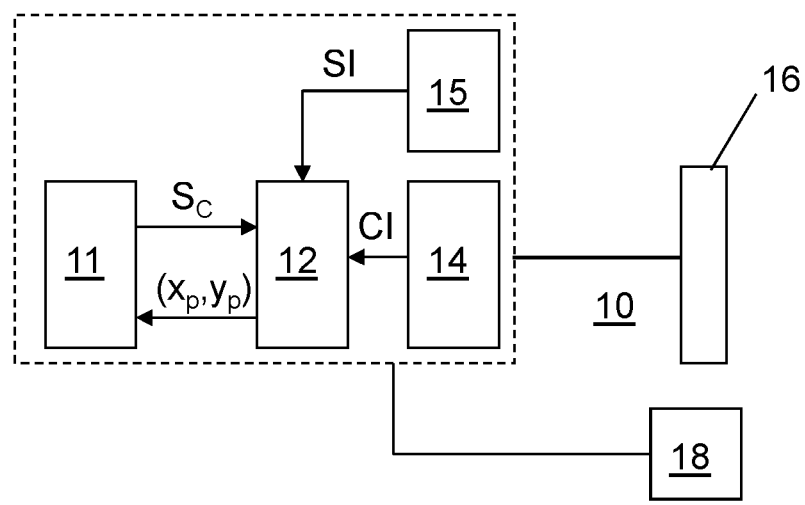
FIG. 5 shows a third embodiment of a device according to the first aspect of the invention.

In an embodiment shown in FIG. 5, the device comprises a storage medium 11 for storing respective predetermined values for the size and shape of the cursor CR associated with positions in a subset of possible cursor positions. Furthermore, the cursor control facility 12 is arranged for adapting a size a size and shape of the cursor according to respective predetermined values for the size and shape stored in the storage medium 11 for a current cursor position $(x_p, y_p)$. In this case, it is not necessary to repeat the calculation of the cursor shape and size if the cursor returns to an earlier visited position, provided that the content of the display 16 has not changed. In that case the cursor control facility 12 specifies the current position $(x_p, y_p)$ of the cursor and retrieves a signal $S_C$ specifying the size and shape of the cursor CR from the storage medium 11. This is in particular advantageous if relatively complex shape adaptations are applied that require a relatively long computation time. For cursor positions deviating from positions for which predetermined values for the size and shape are stored in the storage medium, the cursor control facility 12 may use the data stored for the nearest position as an approximation. The cursor control facility 12 may also use said stored data as initial data to be further refined by the procedure shown in FIG. 2 for example.

In an embodiment the cursor control facility 12 is arranged to calculate an approximate size and shape of the cursor based on an interpolation of two or more predetermined values stored for positions in the subset closest to the position not in the subset. The cursor control facility 12 may also use this data obtained by interpolation as initial data to be further refined by the procedure shown in FIG. 2 for example.

Figure 6:
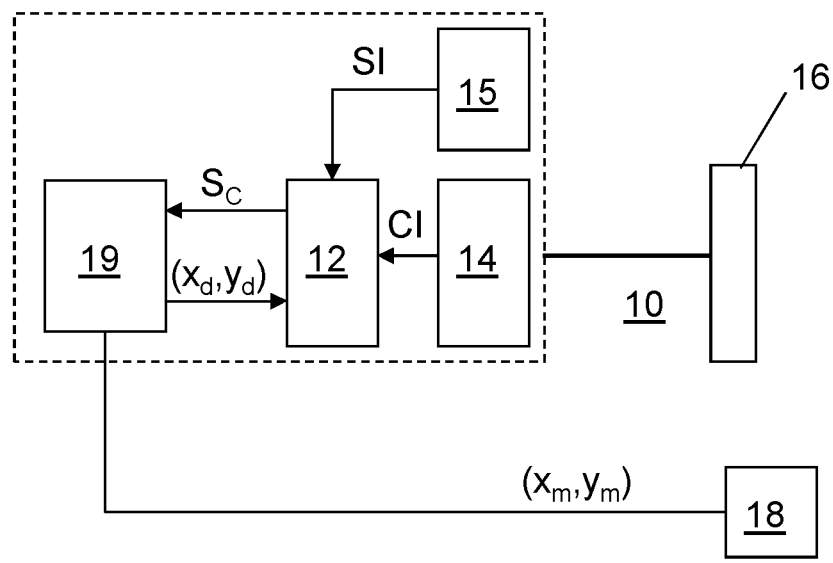
FIG. 6 shows a fourth embodiment of a device according to the first aspect of the invention.

FIG. 6 shows an embodiment of the device 10 having a gain control unit 19. The gain control unit provides for a conversion of coordinates $(x_m, y_m)$ in motor space provided by the user with an input device 18 into coordinates $(x_d, y_d)$ in display space by a gain factor dependent on the size and shape of the cursor CR. Accordingly, the gain control unit 19 receives a cursor input signal indicating an input value for a displacement speed of the cursor and provides an output signal resulting in a displacement of the cursor with a displacement speed related to the input signal by a gain factor that is a monotonously non-decreasing function of the momentary value of the size of the cursor. For example, the cursor speed in a direction x,y may be amplified by a factor that is proportional to the size of the cursor in that direction x,y. In order to prevent a too high cursor speed the gain factor or the output speed may be capped to a certain value. Alternatively, the gain factor $g_x$ for the speed in a certain direction as a function of the size $S_x$ may be a non-linear function that gradually approaches an asymptotic value for that direction, e.g.

$$g_x = \alpha \cdot \frac{S_x}{S_x + 1}$$

Wherein α is a constant factor.

Figure 7:
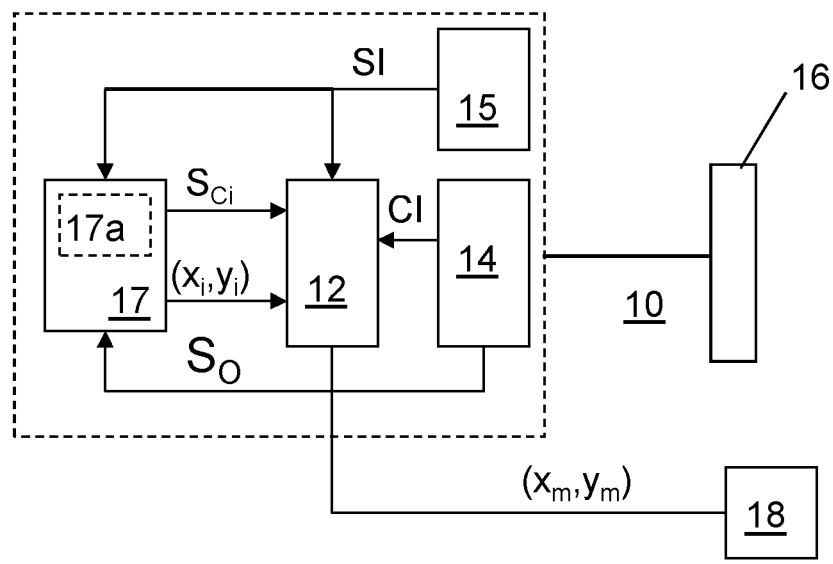
FIG. 7 shows a fifth embodiment of a device according to the first aspect of the invention.

FIG. 7 shows further embodiment of the device according to the invention. In this embodiment the device is provided with a signaling facility 17. The signaling facility 17 receives information $S_O$ indicating which object has the highest coverage fraction and uses this information to signal this object as the identified object by an autonomous movement of the cursor to the identified object and/or by adapting the size and shape of the cursor to that of the identified object. In case an object is identified the signaling facility 17 provides the coordinates $x_i,y_i$ of the identified object $O_i$ to the cursor control facility 12. In addition the signaling facility 17 may provide information $S_{Ci}$ specifying the shape of the identified object $O_i$ so that the cursor can assume this shape.

In an embodiment the signaling facility 17 has a timer 17a that activates the signaling facility 17 if no user input has been received during a predetermined timeinterval.

Figure 8:
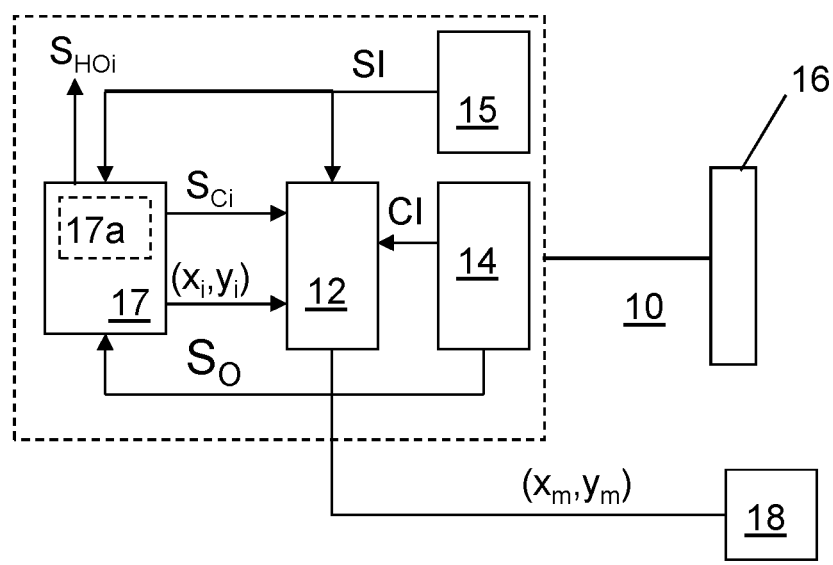
FIG. 8 shows a sixth embodiment of a device according to the first aspect of the invention.

In again another embodiment, shown in FIG. 8, the signaling facility 17 is arranged to signal the identified object Oi by highlighting the identified object, while not effecting the cursor upon such signaling. In this case the signaling facility 17 issues a signal $S_{HOi}$ to an object-rendering facility (not shown) to cause said facility to highlight the object Oi specified by said signal. Likewise, in that embodiment the signaling facility 17 may have a timer 17a that activates the signaling facility 17 if no user input has been received during a predetermined time-interval.

In summary, a device is provided having a visual user interface that enables a user to select one of one or more displayed objects with a cursor having a cursor area. The device comprises a cursor control facility for controlling display of the cursor and a calculating facility for calculating for each object that is at least partly within the cursor area a coverage fraction. The coverage fraction is indicative for the fraction of that object covered by the cursor and for summing these coverage fractions to obtain a coverage indicator. The cursor control facility is arranged for adapting a size of the cursor to a size that achieves a predetermined value for the coverage indicator. In an embodiment also a shape of the cursor is controlled according to shapes of objects present on the display and taking into account the coverage fraction as a weight factor for weighting the shape parameters for the objects.

Although embodiments of the present invention have been illustrated in the accompanying drawings and described in the foregoing detailed description, it will be understood that the invention is not limited to the embodiments disclosed, but is capable of numerous modifications without departing from the scope of the invention as set out in the following claims.

A 'facility', as will be apparent to a person skilled in the art, is meant to include any hardware (such as separate or integrated circuits or electronic elements) or software (such as programs or parts of programs) which reproduce in operation or are designed to reproduce a specified function, be it solely or in conjunction with other functions, be it in isolation or in co-operation with other elements. The invention can be implemented by means of hardware comprising several distinct elements, and by means of a suitably programmed computer. In device claims enumerating several facilities, several of these facilities can be embodied by one and the same item of hardware. 'Computer program product' is to be understood to mean any software product stored on a computer-readable medium, such as a floppy disk, downloadable via a network, such as the Internet, or marketable in any other manner.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present). Also, use of the "a" or "an" are employed to describe elements and components of the invention. This is done merely for convenience and to give a general sense of the invention. This description should be read to include one or at least one and the singular also includes the plural unless it is obvious that it is meant otherwise.

The invention claimed is:

1. A device having a visual user interface enabling a user to select one of one or more displayed objects as an activatable object which may be activated by the user, the device comprising:
    a cursor control facility, wherein the cursor control facility is configured to control a display of a cursor, wherein the displayed cursor occupies a cursor area and wherein the one or more displayed objects include one or more covered objects which are each at least partially within the cursor area;
    a calculating facility, wherein the calculating facility is configured to:
        calculate, for each of the one or more covered objects a coverage fraction, wherein the coverage fraction indicates a fraction of the covered object which is within the cursor area, and
        sum the respective calculated coverage fractions of each of said one or more covered objects to obtain a coverage indicator value, and
    wherein the cursor control facility is configured to:
        adapt a size of the displayed cursor dependent on the coverage indicator value, wherein the size of the displayed cursor is continually adapted until the coverage indicator value satisfies a condition associated with a predetermined value, and
        select, after the coverage indicator value satisfies the condition, one of the one or more covered objects which has a highest coverage fraction among the one or more covered objects, as the activatable object.

2. The device of claim 1, further comprising an additional calculating facility, wherein the additional calculating facility is configured to:
    calculate a shape indicator indicative for an average shape of said objects that are at least partially within the cursor area, said shape indicator being obtained from shape parameters of nearby objects weighted by the coverage fraction of said nearby objects, and additionally adapting a shape of the displayed cursor to the average shape indicated by said shape indicator.

3. The device of claim 2, further comprising:
    a storage medium,
    wherein the storage medium is configured to:
        store respective predetermined values for the size and the shape of the displayed cursor associated with positions in a subset of possible cursor positions, and
    wherein the cursor control facility is configured to:
        adapt the size and the shape of the displayed cursor according to respective predetermined values for the size and the shape stored for a current position of the displayed cursor.

4. The device of claim 3 wherein the cursor control facility is configured to:
    calculate an approximate size and an approximate shape of the cursor for an arbitrary position based on an interpolation of two or more predetermined values for the size and the shape stored for positions in the subset which are closest to said arbitrary position.

5. The device of claim 3, wherein the cursor control facility is configured to use the stored predetermined values or data obtained by interpolation from the stored predetermined values as initial data for the displayed cursor.

6. The device of claim 2 further comprising a gain control unit, wherein the gain control unit is configured to convert coordinates in motor space into coordinates in display space by a gain factor dependent on the size and the shape of the displayed cursor.

7. The device of claim 2, further comprising a signaling facility, wherein the signaling facility is configured to receive information indicating which covered object has the highest coverage fraction and for using this information to signal this covered object as the activatable object by an autonomous movement of the displayed cursor to the activatable object and/or by adapting the size and the shape of the cursor to that of the activatable object.

8. The device of claim 7, wherein the signaling facility comprises:
a timer, wherein the timer is configured to activate the signaling facility if no user input has been received during a predetermined time interval.

9. The device of claim 2, further comprising a signaling facility, wherein the signaling facility is configured to signal identification of an object to the user by highlighting the identified object, while not affecting the cursor upon such signaling.

10. A method for providing a visual user interface enabling a user to select one of one or more displayed objects on a display as an activatable object which may be activated by the user, wherein the one or more displayed objects include one or more covered objects at least partially within a cursor area occupied by a displayed cursor, the method comprising:
for each of the covered objects, calculating a coverage fraction, wherein the coverage fraction indicates a fraction of the covered object which is within the cursor area,
summing the respective calculated coverage fractions of each of said objects to obtain a coverage indicator value,
adapting a size of the displayed cursor dependent on the coverage indicator value, wherein the size of the displayed cursor is continually adapted until the coverage indicator value substantially achieves a predetermined value, and
selecting, after the coverage indicator value substantially achieves the predetermined value, one of the one or more covered objects which has a highest coverage fraction among the one or more covered objects, as the activatable object.

11. The method of claim 10, further comprising:
calculating a shape indicator indicative of an average shape of nearby objects at or near a position of the displayed cursor, and
adapting a shape of the displayed cursor to a shape indicated by the shape indicator.

12. The method of claim 11, wherein the shape indicator is indicative of a relationship between a width and a height of the nearby objects, the displayed cursor having a width and a height, wherein said adapting comprises:
decreasing a width of the displayed cursor if the coverage indicator value is greater than the predetermined value and if the width of the displayed cursor is greater than a width derived from the height of the displayed cursor and the relationship indicated by the shape indicator;
decreasing a height of the displayed cursor if the value of said coverage indicator is greater than the predetermined value and if the width of the displayed cursor is less than a width derived from the height of the displayed cursor and the relationship indicated by the shape indicator;
increasing a height of the displayed cursor if the value of said coverage indicator is less than the predetermined value and if the width of the displayed cursor is greater than a width derived from the height of the displayed cursor and the relationship indicated by the shape indicator; or
increasing a width of the cursor if the value of said coverage indicator is less than the predetermined value and if the width of the displayed cursor is less than a width derived from the height of the displayed cursor and the relationship indicated by the second indicator.

13. The method of claim 11, wherein the shape indicator is calculated using one or more shape parameters of nearby objects weighted by the relative coverage of said nearby objects.

14. The method of claim 10, comprising storing respective predetermined values for the size and a shape of the displayed cursor associated with positions in a subset of possible cursor positions and, when the displayed cursor has a selected position selected from said subset, controlling the size and the shape of the displayed cursor based on the predetermined values stored for the selected position.

15. The method of claim 14, wherein for a position not in said subset, an initial size and shape of the displayed cursor is calculated based on an interpolation of two or more predetermined values stored for positions in the subset closest to the position not in the subset.

16. A tangible computer-readable storage medium that is not a transitory propagating signal or wave, the medium having stored thereon instructions, which when accessed by a processing circuitry of a device, configure the processing circuitry to:
determine, for each object, displayed on a display, which is at least partially within a cursor area which is occupied by a displayed cursor, a coverage fraction, wherein the coverage fraction indicates a fraction of the object which is within the cursor area,
determine a coverage indicator value based on a sum of the respective coverage fractions for each of said objects,
adapt a size of the displayed cursor, wherein the size of the displayed cursor is continually adapted until the coverage indicator value satisfies a condition associated with a predetermined value, and
select, after the coverage indicator achieves the predetermined value, one of the objects which has a highest coverage fraction among the objects as an activatable object which may be activated by the user.

* * * * *